(12) United States Patent
Hansen et al.

(10) Patent No.: US 8,560,154 B2
(45) Date of Patent: Oct. 15, 2013

(54) FREQUENCY SPLITTING AND INDEPENDENT LIMITATION OF VEHICLE TORQUE CONTROL

(75) Inventors: R. Anthony Hansen, Redford, MI (US); Steven M. Hessell, Clarkston, MI (US); Gil J. Mendoza, Novi, MI (US); Robert L. Morris, Milford, MI (US); Houchun Xia, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/039,345

(22) Filed: Mar. 3, 2011

(65) Prior Publication Data

US 2012/0065821 A1     Mar. 15, 2012

Related U.S. Application Data

(60) Provisional application No. 61/382,515, filed on Sep. 14, 2010.

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ............................................................ 701/22

(58) Field of Classification Search
USPC ............................................................ 701/22
See application file for complete search history.

(56) References Cited

U.S. PATENT DOCUMENTS

| | | | | |
|---|---|---|---|---|
| 4,584,505 | A * | 4/1986 | Chung et al. | 318/400.13 |
| 5,631,529 | A * | 5/1997 | Shimizu et al. | 318/432 |
| 5,801,508 | A * | 9/1998 | Obayashi | 318/801 |
| 6,842,673 | B2 * | 1/2005 | Zhang et al. | 701/22 |
| 7,110,867 | B2 * | 9/2006 | Imazu | 701/22 |
| 7,285,869 | B2 * | 10/2007 | Syed et al. | 290/40 C |
| 7,292,917 | B2 * | 11/2007 | Kuang et al. | 701/22 |
| 7,670,256 | B2 * | 3/2010 | Winkelmann et al. | 477/5 |
| 8,138,703 | B2 * | 3/2012 | Heap et al. | 318/432 |
| 8,269,443 | B2 * | 9/2012 | Imai | 318/400.23 |

* cited by examiner

*Primary Examiner* — Khoi Tran
*Assistant Examiner* — Nicholas Kiswanto
(74) *Attorney, Agent, or Firm* — Quinn Law Group, PLLC

(57) ABSTRACT

A method for optimizing torque control in a vehicle having a controller and a rotating member includes generating a closed-loop total proportional torque command using a state space feedback portion of the controller, and splitting the total proportional torque command into high-frequency and low-frequency proportional torque components. A total proportional torque is passed to the rotating member to provide driveline damping control when speed control is not required. The high-frequency proportional torque component is passed to the rotating member to provide driveline damping control, and the low-frequency torque component is passed with a total integral torque command to the rotating member to provide speed control, when speed control is required. A vehicle includes a controller having proportional-integral control capabilities and a state space observer, and a powertrain having a rotating member whose speed and damping characteristics are controlled by the controller.

10 Claims, 1 Drawing Sheet

FREQUENCY SPLITTING AND INDEPENDENT LIMITATION OF VEHICLE TORQUE CONTROL

CROSS-REFERENCE TO RELATED APPLICATIONS

This application claims the benefit of U.S. Provisional Patent Application No. 61/382,515, which was filed on Sep. 14, 2010, and which is hereby incorporated by reference in its entirety.

TECHNICAL FIELD

The present invention relates to the splitting of a total proportional torque command from a state observer-based control law in a vehicle into different high-frequency and low-frequency torque components, and the independent limitation of damping and speed control torques using these torque components.

BACKGROUND

Certain vehicles can be powered using one or more high-voltage electric traction motors. Hybrid electric vehicles (HEV) having a full hybrid powertrain selectively use an internal combustion engine, either alone or in combination with the traction motor(s). A battery electric vehicle (BEV) uses a traction motor as the sole power source, while an extended-range electric vehicle (EREV) uses a gas engine to power a generator when additional electrical energy is required. Typically, a full HEV runs in an electric vehicle (EV) operating mode up to a threshold vehicle speed, and then automatically starts the engine upon reaching the threshold speed. Thereafter, the HEV transitions at least partially to engine torque.

The speeds of the various rotating members of an HEV, BEV, EREV, or EV powertrain, for instance an input speed to a transmission input member and/or a clutch slip speed of one or more of the clutches used within a transmission, may be controlled using a proportional-integral (PI) or a proportional-integral-derivative (PID)-capable controller. Different PI or PID controllers may be used to govern a speed of a given rotating member, as well as to damp any driveline oscillations or pulsations. A state observer can be used as part of the overall control law to provide state estimation within a particular physical system, e.g., the transmission, using various input and output parameters, as well as any required linear or other suitable state equations. In some vehicles, a common state space control law may be applied to both the speed control torque and the driveline damping control torque.

SUMMARY

Accordingly, a method is disclosed herein for splitting a total proportional motor torque command from a state space observer-based control law in a vehicle having at least one electric traction motor. The total proportional torque command is generated along with a total integral torque command by a proportional-integral (PI) or a proportional-integral-derivative (PID) controller, as are well understood in the art. The term "frequency splitting" as used herein refers to the selective separation, using filtering or other suitable means, of the total proportional torque command into separate high-frequency and low-frequency torque components when speed control is required.

Once separated, the high-frequency torque component may be assigned a lower priority, and used as the damping control torque command when speed control is required, i.e., when one or more speed degrees of freedom are present in the system being controlled. The low-frequency torque component may be added to the integral torque, i.e., the torque output of an integrator portion of the controller, and passed as the speed control torque command whenever speed control is required. When speed control is not required, the total proportional torque command may be passed through a damping control path to the rotating member and used to control driveline damping. After frequency splitting, the separate torque components can be independently gain-limited with respect to each other as needed. Such a result may be useful when faced with a predetermined constraint such as a battery power limit or a traction motor torque limit.

The controller disclosed herein selectively passes the low-frequency torque component of the total proportional torque command through a common speed control path with the integral torque command, and uses the combined torque to provide speed control over the rotating member as needed. This may be done via a torque determining module or other suitable algorithm or software subroutine. A calibrated low-pass filter can be used to isolate the desired low-frequency torque component, with an optional software trigger used to determine when such filtering is required. The high-frequency torque component may be calculated by subtracting the low-frequency torque component from the total proportional torque command. The high-frequency torque component can then be used as the driveline damping torque, thus stabilizing instances where damping torque would otherwise be clipped or temporarily limited, e.g., due to the presence of predetermined constraints. The low-frequency torque and the total integral torque are passed even when the high-frequency torque component is limited.

In particular, the present method optimizes torque control in a vehicle having a controller and a powertrain with a rotating member. The controller selectively combines an integral torque and a low-frequency proportional torque component to provide speed control over the rotating member, with driveline damping control provided via a high-frequency proportional torque component when speed control is required. The method includes selectively splitting a total proportional torque command into high-frequency and low-frequency torque components when speed control is required, and then passing the combined low-frequency torque component and a total integral torque to the rotating member through a common speed control path. This optimizes control situations where a battery power constraint, a clutch torque constraint, a motor torque constraint, or other predetermined constraint is present.

A vehicle comprising a controller having proportional-integral control capabilities and a state space observer, and a powertrain having a rotating member whose speed and damping characteristics are controlled by the controller. The controller is configured for executing the above described method.

The above features and advantages and other features and advantages of the present invention are readily apparent from the following detailed description of the best modes for carrying out the invention when taken in connection with the accompanying drawings.

DESCRIPTION

Figure 1:
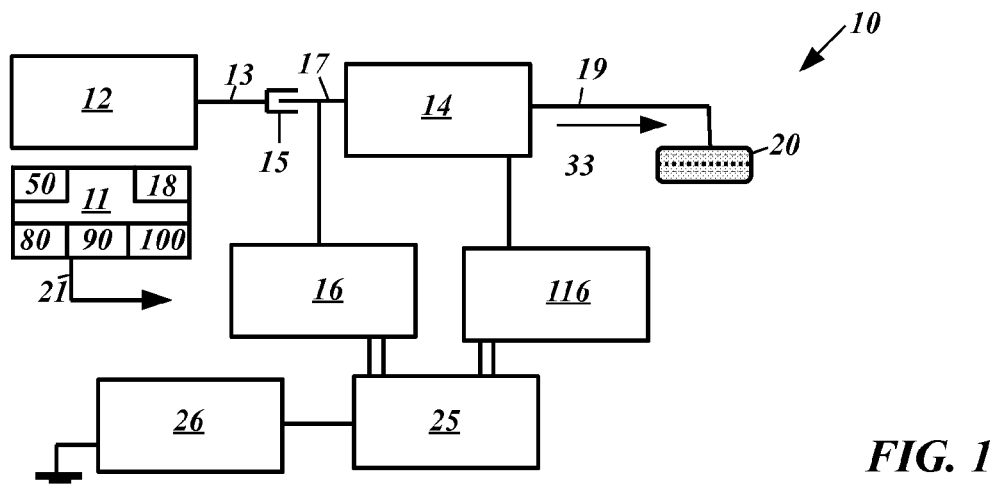
FIG. 1 is a schematic illustration of a vehicle having a controller with state observer and proportional-integral (PI) control capabilities as disclosed herein.

Referring to the drawings, a vehicle 10 is shown schematically in FIG. 1. The vehicle 10 may be propelled at least part of the time in an electric vehicle (EV) propulsion mode, e.g., as a hybrid electric vehicle as shown, or as a battery electric or extended-range electric vehicle. The vehicle 10 includes a controller 11 that provides proportional-integral (PI) functionality via a PI algorithm 80 and state space feedback control via a state observer 90, to thereby control speed torque and driveline damping-related torque in the vehicle 10. The state observer 90 provides state space representation in the form of a mathematical model or models of the various systems being controlled, with the models forming a related set of inputs, outputs, and state variables as understood in the art. PI functionality of the PI algorithm 80 is described in detail below.

As explained below with reference to FIGS. 2 and 3, the controller 11 executes the present method 100 when speed control is required in order to selectively split a total proportional torque command generated by the PI algorithm 80, i.e., the proportional (P) terms of a PI control law, into a high-frequency proportional torque component and a low-frequency proportional torque component. The controller 11 combines speed control, i.e., the low-frequency proportional torque component and the integral (I) terms of the PI control law, with driveline damping control, i.e., the high-frequency proportional torque component of the same PI control law. The integral component and low-frequency proportional torque component are passed to a torque determination/arbitration algorithm or subroutine 66 (see FIG. 2) that is resident within or otherwise executable by the controller 11.

As used herein, the terms "high-frequency" and "low-frequency" are determined with respect to error calculation gains. Proportional torque is generated as a function of any gained error in the multiple estimated states and reference or target states generated by the controller 11. For example, at time (t), the torque based on the gained error may jump from 0 Nm to 10 Nm. A sudden jump of this magnitude in one processor loop may be considered high-frequency. Such a loop may be approximately 6.25 ms in one possible embodiment, although the loop time will vary with the vehicle design. If the torque remained at 10 Nm for a predetermined number of subsequent processor loops, this may be considered low-frequency, i.e., the terms "high" and "low" are relative to the processor loop time as well as to each other.

Controlling to a speed target typically requires a slower response time than controlling to a damping target. Therefore, in one embodiment the controller 11 can use a calibrated filtering frequency, e.g., approximately 2 Hz, so that a torque falling below that level is used for speed control and a torque falling above that level is used for driveline damping. The calibrated filtering frequency value can be modified as needed during the various operating states of the vehicle 10, and based on the particular frequency response of the driveline.

Still referring to FIG. 1, the controller 11 can initially prioritize torque commands, for example in the following order: (1) speed control, which is provided by the combined integral torque component and low-frequency proportional torque component; (2) propulsion torque, i.e., transmission output torque; and (3) driveline damping torque, which is at least the high-frequency proportional torque component. The controller 11 can determine whether battery power limits, motor torque limits, or another predetermined constraint is present. The torque component having the lowest priority is temporarily clipped or otherwise limited during such a constraint. This is the driveline damping torque or high-frequency proportional torque. However, it is observed herein that passing only the total integral torque without the proportional torque component can result in system instability under certain operating conditions. The controller 11 and the present method 100 are therefore structured to address this issue.

When configured as a hybrid electric vehicle as shown in FIG. 1, an internal combustion engine 12 can be selectively connected to a transmission 14 via an input clutch and damper assembly 15. The clutch and damper assembly 15 is operable for damping transient pulsations from the connection between a rotating crankshaft 13 of engine 12 and an input shaft 17 of the transmission 14. High-voltage electrical traction motors 16, 116 selectively deliver motor torque to the transmission 14 as needed, and thereby power the vehicle 10 in an EV propulsion mode. This may occur up to a threshold vehicle speed. Above the threshold speed, the engine 12 can be automatically restarted, and engine output torque thereafter can be used to power the input shaft 17.

The transmission 14 has an output shaft 19 connected to a set of drive wheels 20. The transmission 14 may be configured as an electrically-variable transmission (EVT) or any other suitable transmission capable of transmitting torque to the wheels 20 via the output shaft 19. The output shaft 19 delivers the output torque (arrow 33) in response to a torque request from a driver of vehicle 10, e.g., a depression of an accelerator pedal.

The traction motors 16, 116 may be configured in one possible embodiment as a multi-phase electric machine of approximately 60 VAC to approximately 300 VAC or more depending on the required design. Other embodiments may be used, e.g., induction motors, depending on the vehicle design. Each traction motor 16, 116 is electrically connected to an energy storage system (ESS) 26 via a high-voltage DC bus, a power inverter module 25, and a high-voltage AC bus. A DC-DC converter (not shown) may be used to regulate the voltage to a 12 VDC auxiliary power system aboard the vehicle.

The method 100 can be programmed as a computer-executable set of instructions or code, and stored on a tangible/non-transitory computer-readable medium or distributed media. Such instructions or code can then be selectively executed by associated hardware components of the controller 11, e.g., a host machine or computer device configured as set forth below. The controller 11 may be a single control device or a distributed networked control device that is electrically connected to or otherwise placed in electrical communication with the engine 12, the traction motors 16 and 116, and the transmission 14 via suitable control channels. Such control channels may include any required transfer conductors providing a hard-wired or wireless control link suitable for transmitting and receiving the necessary electrical control signals for proper power flow control and coordination aboard the vehicle 10. The controller 11 may include such additional control modules and capabilities as might be necessary to execute the required power flow control functionality aboard vehicle 10 in the desired manner.

Still referring to FIG. 1, the controller 11 may include a microprocessor or central processing unit, read only memory (ROM), random access memory (RAM), electrically-erasable programmable read only memory (EEPROM), high speed clock, analog-to-digital (A/D) and digital-to-analog (D/A) converter circuitry, and input/output circuitry and devices (I/O), as well as appropriate signal conditioning and buffer circuitry. Any algorithms and reference tables resident in the controller 11 or accessible thereby, including any algorithms or reference tables needed for executing the present method 100, can be stored in memory 18, i.e., non-transitory and tangible computer-readable media, and automatically executed by the hardware components of the controller 11, e.g., a host machine, in order to provide the respective functionality.

Memory 18 used by the controller 11 may include any non-transitory medium that participates in providing computer-readable data or process instructions. Such a medium may take many forms, including, but not limited to, non-volatile media and volatile media. Non-volatile media may include, for example, optical or magnetic disks, flash memory, and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory 18 may also include a floppy disk, a flexible disk, hard disk, magnetic tape, any other magnetic medium, a CD-ROM, DVD, any other optical medium, etc.

As noted above, the controller 11 provides proportional-integral control functionality and state space observation capabilities. Both terms are well understood in the art. The state space observer qualities of the controller 11 include the capability of modeling a physical system, e.g., clutch states or other desired states of the powertrain or of the transmission 14 shown in FIG. 1, to provide an estimate of the internal state of the system using various input and output measurements, as well as state variables which are related by first order differential equations. Inputs to the controller 11 may include measured engine speed, speeds of the traction motors 16, 116, and an actual or estimated output speed of the transmission 14. The controller 11 outputs a total torque command 21 to a given rotating component being controlled, e.g., the traction motors 16, 116, to control both the speed of the member and the level of driveline damping provided by that member.

Figure 2:
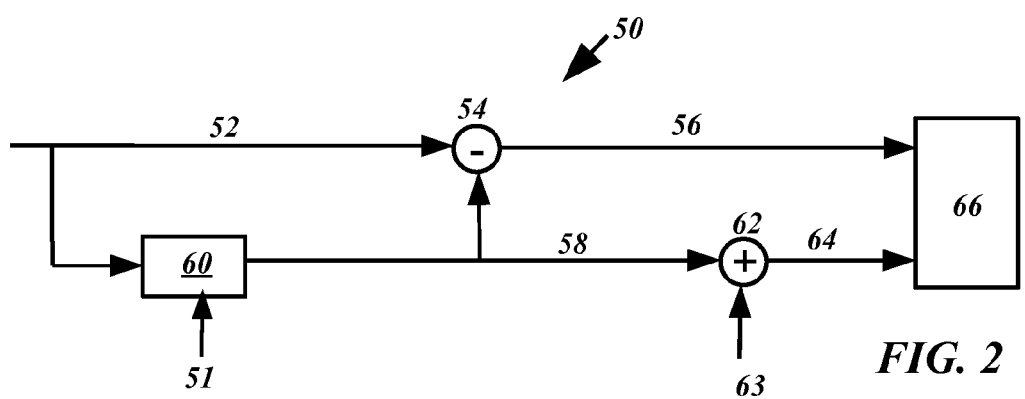
FIG. 2 is a schematic illustration of the torque signal splitting functionality of the controller shown in FIG. 1.

Referring to FIG. 2, the common state space feedback portion of the controller 11 may be used to generate a closed-loop proportional torque command 52 for the damping control torques applied to a selected one of the traction motors 16, 116 of FIG. 1. As understood in the art, open-loop motor torque commands are subject to various constraints, e.g., battery power limits and/or motor torque limits. However, closed-loop motor torque commands are not considered in such constraints. As a result, the closed-loop proportional torque command 52 could violate the constraints at times. The method 100 is thus applied to address this situation.

When speed control is required, a frequency splitting routine 50 (see FIG. 1), potentially including using a calibrated low-pass filter, is executed by the controller 11 to automatically split the closed-loop proportional torque command 52, i.e., the total proportional term of the proportional-integral control law provided by the controller 11, into different frequency components. These include a high-frequency torque component 56 used for the damping torque and a low-frequency torque component 58 used for the speed control torque. Under a battery power constraint, a motor torque constraint, a clutch torque constraint, or other predetermined constraint(s), the low-frequency torque component 58 can be selectively assigned a higher priority than the high-frequency component 56 in order to maintain a required input speed to the transmission 14 shown in FIG. 1, as well as clutch slip speed control within the transmission 14.

The frequency splitting routine 50 can isolate the low-frequency component 58 by passing the closed-loop motor torque command 52 through a suitable low-pass filter 60. Unless temporarily disabled, e.g., by a software trigger 51 or other selectively enabled signal, the low-frequency torque component 58 is then fed to a computational node 54.

The low-frequency torque component 58 bleeds down to a zero value when the low-pass filter 60 is reset or otherwise signaled by the software trigger 51. The effect of the bleed down process is to shift the low-frequency portion of the proportional torque command 52 from the low-frequency torque component 58 to the high-frequency torque component 56 in a blended fashion. In other words, all proportional torque, once it has been fully bled to zero, goes to the high-frequency torque component 56, and forms all of the proportional torque command 52. When this happens, the low-frequency torque component 58 is equal to 0 Nm and the integral torque component 63, i.e., the speed control torques, are also equal to 0 Nm, thus making the speed control torque 64 equal to 0 Nm.

At node 54, the low-frequency torque component 58 is subtracted from the closed-loop proportional torque command 52 to calculate the high-frequency torque command 56. The low-frequency torque component 58 is then sent to a computational node 62, where it is combined with the integral torque component 63, i.e., the speed control torques. The resultant torque command 64 is passed to a torque determination module 66 of the control system 11. In this manner, a selected rotating member of vehicle 10, e.g., the input member 17 of the transmission 14 shown in FIG. 1, still receives the low-frequency torque component 58 through a common speed control path whenever the predetermined constraint is present. When the constraint is no longer present, the high-frequency torque component 56 may be provided as well.

These two torque values can be independently limited downstream of node 54 as needed. This allows the input speed to the transmission 14 of FIG. 1 to be maintained, as well as clutch slip speed control, for example when the vehicle 10 of FIG. 1 is running against motor torque, clutch torque, and/or battery power constraints. In other words, the speed control torques, which are generally but not necessarily limited to the integral control term and low-frequency proportional control term, can be allowed to take priority as needed over the high-frequency proportional control terms so as not to violate the constraint.

Figure 3:
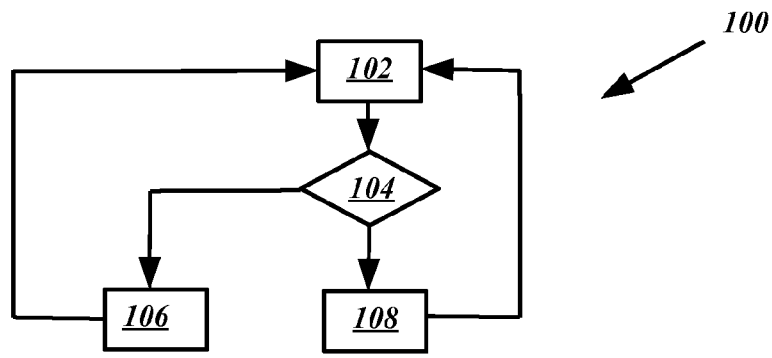
FIG. 3 is a flow chart describing a control method usable with the vehicle shown in FIG. 1.

Referring to FIG. 3, the present method 100 begins with step 102, wherein the control system 11 shown in FIG. 1 generates the total proportional torque command 52 of FIG. 2. At step 104, the controller 11 determines whether speed control is not required for a particular operating state. If speed control is not required, the controller 11 executes step 106. However, step 108 is executed if speed control is required.

Speed control may be required whenever there is at least one speed degree of freedom. As used herein, the term "speed degree of freedom" refers to the number of speeds that can be independently controlled. With speed control, up to two speeds can be controlled at a given time, e.g., clutch input speed and clutch slip, or two clutch slips when in a neutral state (two speed degrees of freedom). One speed degree of freedom is present in a mode state, e.g., input speed only. There may be no controlled speeds at all in a fixed gear case, i.e., zero degrees of freedom, as the speeds are dictated by the vehicle. Therefore, in one embodiment speed control is determined as being required in a neutral state and any mode state, and not required in a fixed gear state.

At step 106, the proportional torque command 52 is not split, and the full closed-loop proportional torque provides driveline damping as needed. Since torque splitting is effectively disabled, the low-pass filter 60 of FIG. 2 is bled down so that all of the proportional torque goes to the high-pass side as noted above with reference to FIG. 2. For example, the optional software trigger 51 shown in FIG. 2 may be tripped when a vehicle condition is present in which speed control is not required, with an input to the low-pass filter 60 of FIG. 2 set to zero when this condition occurs. A filter coefficient of the low-pass filter 60 can then be set to a relatively fast response to expedite the bleed off process.

Other conditions or modes may also exist where one traction motor is used for speed control, and the other traction motor is not. In other words, the speed degree of freedom affects the one motor, while the other motor's speed is dictated by another speed. This is normally the case where the motor closest to the input is used for speed control while the motor closest to the output is used for damping control.

At step 108, the controller 11 of FIG. 1 initiates the frequency splitting routine 50 to thereby split the total proportional torque command 52 into the high-frequency torque component 56 and the low-frequency torque component 58 shown in FIG. 2. These torque commands are processed and applied as set forth above, i.e., with the high-frequency torque component 56 used to damp driveline oscillations, and the combined low-frequency torque component and integral torque used to provide speed control as needed.

While the best modes for carrying out the invention have been described in detail, those familiar with the art to which this invention relates will recognize various alternative designs and embodiments for practicing the invention within the scope of the appended claims.

The invention claimed is:

1. A method for optimizing torque control in a vehicle having a control system and a powertrain, wherein the powertrain includes a clutch, an electric traction motor powered via a battery, and a rotating member, and wherein the control system is configured to execute a proportional-integral (PI) control algorithm and a state space observer providing a state space feedback control law, the method comprising:
generating a closed-loop total proportional torque command using the state space feedback control law;
generating a total integral torque command by executing the PI control algorithm;
selectively splitting the total proportional torque command into a high-frequency proportional torque component and a low-frequency proportional torque component, via a frequency splitting routine or a calibrated low-pass filter, when speed control of the rotating member is required;
selectively assigning a higher priority to the low-frequency proportional torque component than the high-frequency proportional torque component during a predetermined vehicle constraint, wherein the predetermined vehicle constraint is a power constraint of the battery, a torque constraint of the clutch, or a torque constraint of the electric traction motor;
passing a total proportional torque from the controller to the rotating member to provide driveline damping control when the speed control of the rotating member is not required; and
passing the high-frequency proportional torque component to the rotating member to provide driveline damping control, and passing the low-frequency torque component and the total integral torque command through a common speed control path to the rotating member when the speed control of the rotating member is required.

2. The method of claim 1, wherein selectively splitting the total proportional torque command includes passing the total proportional torque command through the calibrated low-pass filter to thereby isolate the low-frequency proportional torque component.

3. The method of claim 1, wherein selectively splitting the total proportional torque command includes calculating the high-frequency proportional torque component via the frequency splitting routine by subtracting the low-frequency proportional torque component from the total proportional torque command.

4. The method of claim 1, further comprising:
selectively resetting or bleeding to zero the low-pass filter used for splitting the total proportional torque command upon detecting the presence of a fixed gear state of the vehicle.

5. The method of claim 1, further comprising:
applying separate gain limiters to the high-frequency torque component and the low-frequency torque component during the predetermined vehicle constraint.

6. The method of claim 1, wherein the speed control of the rotating member is required during the predetermined vehicle constraint, the method further comprising:
temporarily limiting the driveline damping torque for only as long as the vehicle constraint remains present.

7. A vehicle comprising:
a controller having a proportional-integral (PI) control algorithm and a state space observer providing a state space feedback control law; and
a powertrain having a clutch, an electric fraction motor powered via a battery, and a rotating member whose speed and damping characteristics are controlled by the controller;
wherein the controller is configured for:
generating a total proportional torque command using the state space feedback control law of the state space observer;
generating a total integral torque command by executing the PI control algorithm;
selectively splitting the total proportional torque command into a high-frequency proportional torque component and a low-frequency proportional torque component via a frequency splitting routine or a calibrated low-pass filter when speed control of the rotating member is required; and
when the speed control is required:
selectively assigning a higher priority to the low-frequency component than the high-frequency component during a predetermined vehicle constraint, wherein the predetermined vehicle constraint is one of a power constraint of the battery, a torque constraint of the clutch, and a torque constraint of the electric traction motor;
passing the low-frequency proportional torque component and the total integral torque command to the rotating member through a common speed control path to thereby provide speed control over the rotating member; and
passing the high-frequency proportional torque component to the rotating member to provide driveline damping control via the rotating member; and
when the speed control is not required:

passing the total proportional control torque to the rotating member to provide driveline damping control.

8. The vehicle of claim 7, wherein selectively splitting a total proportional torque command includes using the calibrated low-pass filter, and wherein a filtering frequency of the low-pass filter is allowed to vary with an operating mode of the vehicle.

9. The vehicle of claim 7, wherein the powertrain includes a transmission, and wherein the rotating member is connected to the electric traction motor and is used to control an input speed to the transmission.

10. The vehicle of claim 7, wherein the controller is configured for bleeding down the low-frequency torque component to a zero value when the low-pass filter is reset via a software trigger.

* * * * *